United States Patent [19]
Rijhsinghani

[11] Patent Number: 5,987,522
[45] Date of Patent: Nov. 16, 1999

[54] PRIVILEGED VIRTUAL LOCAL AREA NETWORKS

[75] Inventor: Anil G. Rijhsinghani, Marlborough, Mass.

[73] Assignee: Cabletron Systems, Inc., Rochester, N.H.

[21] Appl. No.: 09/006,240

[22] Filed: Jan. 13, 1998

[51] Int. Cl.$^6$ ............................................. G06F 13/00
[52] U.S. Cl. ....................................................... 709/240
[58] Field of Search ........................ 364/DIG. 1 MS File, 364/DIG. 2 MS File; 709/200, 206, 207, 217, 218, 219, 228, 232, 236, 240, 249, 250

[56] References Cited

U.S. PATENT DOCUMENTS

| | | |
|---|---|---|
| 5,218,603 | 6/1993 | Watanabe ............................. 370/85.13 |
| 5,394,402 | 2/1995 | Ross ....................................... 370/94.1 |
| 5,473,608 | 12/1995 | Gagne et al. ......................... 370/85.13 |

*Primary Examiner*—Robert B. Harrell
*Attorney, Agent, or Firm*—Wolf, Greenfield & Sacks, P.C.

[57] ABSTRACT

A switch for use in a virtual communications system having multiple local area networks interconnected by multiple switches includes a first communications port connected to a network resource and a second communications port connected to other switches in the virtual communications system. A control console detects a communication from the resource to an addressee. The addressee is a member of a local area network within one or more virtual networks which exclude the network resource. The local area network is interconnected to the second communications port by another switch. The control console appends a privileged header to the communication which is detected by the other switch. Responsive to detection of the privileged header the other switch directs the communication to the local area network.

23 Claims, 9 Drawing Sheets

PRIVILEGED VIRTUAL LOCAL AREA NETWORKS

TECHNICAL FIELD

The present invention relates generally to communications networks and more particularly to virtual area networks which facilitate privileged communications.

BACKGROUND ART

Local area networks (LANs) are used to facilitate communications between a number of users. Individual LAN's may be bridged together to allow a larger number of users to communicate amongst themselves. These bridged LAN's may be further interconnected with other bridged LAN's using routers to form even larger communications networks.

Prior art FIG. 1 depicts an exemplary interconnected bridged LAN system. The numerals 10, 20, 30, etc., are used to identify individual LAN's. Bridges between LAN's are designated by the numerals 5, 15, 25 and 35. A router between bridged LAN 100 and bridged LAN 200 is identified with the reference numeral 300. In the prior art bridged LAN system depicted, a user A is able to communicate with a user B without leaving the LAN 10. If user A desires to communicate with users C in LAN 20 or user D in LAN 30, the communication is transmitted via bridges 5 and/or 15.

If user A desires to communicate with user E, the communication must be routed via router 300 to bridged LAN 200. As will be understood in the art, bridges operate at layer 2 of the network model and transparently bridge two LANs. It is transparent to users A and C that communications between them are ported over bridge 5 because layer 2 bridges do not modify packets, except as necessary to comply with the type of destination LAN. However, if user A wishes to communicate with user E, the communication must be ported via router 300 which operates at level 3 of the network model. Accordingly, communications over routers flow at a slower rate than communications over a bridge, and are regulated by the routers.

Therefore, LAN network administrators generally attempt to connect together those users who frequently communicate with each other in bridged LAN's. However, if the bridged LAN becomes too large, it becomes unscaleable and may experience various well-known problems. Accordingly, routers are used to interconnect bridged LAN's so that the bridged LAN's themselves can be kept to an acceptable size. This results in delays in communications between users which are transmitted via the router 300. If, for example, in FIG. 1, user E and user A need to communicate frequently, it would be advantageous to interconnect LAN 10 and LAN 50 via a bridge rather than the router 300. This would require the rewiring of the system which is costly and may be impracticable under many circumstances, such as, if users A and E will only need to frequently communicate over a limited period of time.

Virtual LAN's (VLAN's) have recently been developed to address the deficiencies in interconnected bridged LAN systems of the type depicted in FIG. 1. VLAN's allow LAN's to be bridged in virtually any desired manner independent of physical topology with switches operating at layer 2. Hence, the switches are transparent to the user. Furthermore, the bridging of LAN's can be changed as desired without the need to rewire the network. Because members of one VLAN cannot communicate with the members of another VLAN, a fire wall is established to provide security which would not be obtainable in a hardwired LAN. Accordingly, the VLAN provides enhanced security over hardwired bridged LAN's.

For example, as shown in prior art FIG. 2, individual LAN's 10–90 are interconnected by layer 2 switches 5'–55'. A network management station (NMS) 290 controls the interconnection of the individual LAN's such that LAN's can be easily bridged to other LAN's on a long term or short term basis without the need to rewire the network. As depicted in FIG. 2, the NMS 290 has configured two VLAN's by instructing, e.g., programming, the switches 5'–35' and 55' such that LAN's 10–60 are bridged together to form VLAN 100' and LAN's 70–90 are bridged together by switches 45' and 55' to form VLAN 200'. This is possible because unlike the bridges 5–35 of FIG. 1 which include only two ports and are, accordingly, able to only transfer information from one LAN to another LAN, the switches 5'–55' are multiported and instructed by the NMS such that the network can be configured and reconfigured by simply changing the switch instructions.

As shown in FIG. 2, the switch 55' has been instructed to transmit communications from user A of LAN 10 to user E of LAN 50, since both users are configured within VLAN 100'. User A, however, is not allowed to communicate to with users H or F since these users are not configured within the VLAN 100' user group. This does not, however, prohibit users F and H, both of whom are members of VLAN 200', from communicating via switches 45' and 55'.

If, it becomes desirable to change the network configuration, this is easily accomplished by issuing commands from NMS 290 to the applicable switches 5'–55'. For example, if desired, user H could be easily added to VLAN 100' by simply reconfiguring VLAN 100' at the NMS 290 to cause an instruction to be issued to switch 55' to allow communications to flow from users A–D and E to user H via switch 55', i.e., to include LAN 90 in VLAN 100'. Because the switches 5'–55' are layer 2 switches, the bridge formed by the switch is transparent to the users within the VLAN. Hence, the transmission delays normally associated with routers, such as the router 300 of FIG. 1, are avoided. The power of the VLAN lies in its ability to dynamically control the network configuration through software on the NMS 290. More particularly, in accordance with its programmed instructions, the NMS 290 generates and transmits signals to instruct the switches 5'–55' to form the desired VLAN configurations.

Multicasting refers to the ability of a station on the network to simultaneously communicate a single message to a number of other stations on the network. In a typical LAN protocol, as shown in FIG. 3, the communication packet 400 includes a destination address 110 having six bytes, a source address 113 and a message portion 114. If the I/G (Individual/Group) bit 112 is set to zero, the packet is directed to a single specified address. However, if the I/G bit 112 is set to one, the packet is transmitted to all LAN's of the bridged LAN.

For example, referring to FIG. 1, if member A of bridged LAN 100 wishes to multicast to members B and C of bridged LAN 100, the I/G bit of the destination address of the message packet would be set at one. If the I/G bit of the destination address, i.e., the multicast address, is at one, the bridges 5 and 15 read this as a multicast address which is directed to all LAN's within the bridged LAN 100. It will be recognized that multicast communications are not routed by routers such as router 300 of FIG. 1. Accordingly, in a standard LAN system, multicast communications cannot be distributed between bridged LAN's. Further, because multicast communications within a bridged LAN are distributed to all individual LAN's, e.g., 10–30 in FIG. 1, whether or not the sender desires the message to reach any member of a particular LAN within the bridged LAN, network bandwidth may be unnecessarily utilized.

In a VLAN network, the aforementioned problems are avoided. First, because all switching is done at level 2, i.e., no level 3 routers exist in the system, multicast communications may be transmitted to network members on any LAN within the VLAN. Further, using the NMS 290, a VLAN can be configured to include only those individual LAN's which include members to whom it is desired to transmit the multicast. Accordingly, network bandwidth is not unnecessarily used to transmit multicast messages to individual LAN's which lack members to whom the multicast communication is addressed. As will be recognized by those skilled in the art, as multicasting continues to grow in popularity, the amount of wasted bandwidth utilization in standard LAN networks has increased. Hence, the reduction in this unnecessary bandwidth utilization and the ability to multicast to any user within a VLAN provides significant advantages over standard LAN architectures.

Further still, because VLANs can be rearranged or reconfigured dynamically, the members within a multicast group can be increased or decreased simply by modifying the multicast VLAN using the NMS 290 of FIG. 2. For example, if multicasting becomes excessive over VLAN 100', the NMS 290 can easily reconfigure the VLAN to exclude one or more LAN's to reduce the multicasting overhead on the VLAN. That is, VLAN 100' could be reconfigured to, for example, exclude LAN 60, thereby reducing the communications overhead of the VLAN.

Prior art FIG. 4 is a schematic of an exemplary VLAN system. The VLAN system includes LANs 205–260 which are connected by switches 270–280 to a high-speed LAN backbone 265. An NMS 290 is interconnected to the switches 270–280 via LAN 260. A trunk station 285 is connected to the high-speed LAN backbone 265. The LAN's 205–215, and 230–235 have designated members F–J. Each of the switches 270–280 is capable of directly interconnecting the respective LAN's connected by access port 305 or 310 thereto, and also interconnecting each of these LAN's to other LAN's directly connected by an access port to another of the switches via the high-speed LAN backbone 265. For example, switch 270 can be instructed by the NMS 290 to interconnect LAN 205 to LAN 215 by configuring a VLAN including LAN's 205 and 215, thereby facilitating communications between F and H. Switches 270 and 275 can also be instructed by the NMS 290 such that member F of LAN 205 can be interconnected by a virtual network to user I of LAN 230.

Prior art FIG. 5 depicts a VLAN communications packet 400' which is identical to the LAN communications packet 400 depicted in FIG. 3, except that a VLAN header 116 has been added to the packet. The header is appended by the initial switch to which the message packet is directed. The VLAN header identifies the resulting packet as a "VLAN" or "tagged" packet, and represents the particular VLAN from which the packet originated.

For example, if in FIG. 4 LAN's 205, 220 and 230 are within a single VLAN and member F of LAN 205 desires to communicate with member I of LAN 230, the message 114 of FIG. 5 with the destination address 110 attached is directed to access port 305 of the switch 270. The switch determines, based upon instructions previously received from the NMS, that the member I address falls within the applicable VLAN and, accordingly, adds the appropriate VLAN header to the packet to form packet 400', as shown in FIG. 5. The packet 400' is then directed via trunk port 315 to the high-speed backbone LAN 265 and read by switches 275 and 280.

Since switch 280 lacks any access ports connected to LAN's within the applicable VLAN, switch 280 discards the communication. Switch 275, however, identifies the VLAN header 116 of packet 400' as associated with a VLAN which includes LAN 230. The switch 275 accordingly removes the header and directs the communication, which now appears as message 400 in FIG. 3, to LAN 230 over which the member I receives the message.

Accordingly, VLANs have numerous advantages over conventional interconnected bridged LAN configurations. However, to obtain these advantages the system must remain under control of the NMS. Thus, in conventional VLAN systems the NMS must be configured within each VLAN. A significant problem can arise in the control of VLAN switches if an operator of the NMS inadvertently excludes itself from a configured VLAN or places itself in a VLAN in which no other LANs are included. In such situations, NMS control over the system configuration could be lost in whole or part.

OBJECTIVES OF THE INVENTION

Accordingly, it is an object of the present invention to provide a VLAN system with switch control protection.

It is a further object of the present invention to provide a technique which ensures the availability of VLAN configuration control.

It is another object of the present invention to provide a VLAN system which is not subject to switch control loss due to inadvertent operator error.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the present invention, a switch, typically a multiported reconfigurable switch, is provided for use in a virtual communications network having multiple local area networks interconnected by multiple switches to form multiple virtual area networks. The switch includes a first communications or access port connected to a network resource and a second communications or trunk port connected via a trunk, to other switches in the virtual communications network. The network resource could, for example, be a network manager or network server, and may be a member of a local area network and/or one or more virtual networks.

A control console, associated with the switch, detects a communication from the network resource to an addressee. This may be accomplished by simply detecting all communications input to the first communications port and associating such communications with the network resource. The control console appends a privileged VLAN header to the communication and in this regard serves as a tagger.

The privileged header is detectable by the other network switches which are connected by access ports to other local area networks, each of which may be within a one or more virtual networks. Responsive to detecting the privileged header, these other network switches direct the communication to the addressee, even if the addressee is a member of a local area network within a virtual network(s) which exclude the network resource. The other network switches also direct the communication to the addressee, even if the network resource is a member of a local area network within one or more virtual networks which exclude the addressee's local area network. Beneficially, the privileged header is removed from the communication by these network switches prior to directing the communication to the addressee.

Each of these other switches, which are typically also multiported reconfigurable switches, includes a first communications or access port connected to the addressee's local area network and a second communications or trunk port connected, via the trunk, to the other switches in the virtual communications network. Each switch also includes a control console which allows the message portion of a communication addressed to a addressee, as a member of the applicable local area network within one or more virtual area networks, to be transmitted from the second communications port, which in this case serves as an input port, to the first communications port, which serves as an output port, if the message either includes a communication from a sender within the applicable virtual networks or a message included in a communication designated as privileged from a network resource outside the applicable virtual networks.

Preferably, the controller removes the privileged header from the privileged communication prior to allowing the message to be transmitted from the second or input communications port to the first or output communications port of the switch. The transmitting of the message from the input port to the output port is accomplished by controlling a switching device so as to transmit the message from the input port to the output port. The switching device, along with the ports and controller, are typically part of the switch. Preferably the switching device is connected by the first communications port directly to the addressee's local area network, i.e. preferably there are no other switching devices between the first communications port and the addressee's local area network.

Accordingly, a virtual communications network can be provided with multiple local area networks interconnected by multiple switches of the type described above to form multiple virtual area networks. In such a network, a switching device, which is part of a first switch, can link a network resource to a local area network which is within one or more virtual networks, all excluding the network resource, by appending a privileged header to a communication addressed to a member of the local area network. A tagger, which is preferably part of the switch control console of the switch, can be used for this purpose.

A switch controller, which is preferably part of the control console of another switch, detects the privileged header and controls the switching device of this other switch, so as to direct the communication to the addressee responsive to detection of the privileged header. Preferably, the controller removes the privileged header from the communication prior to the switching device directing the communication to the addressee.

BEST MODE FOR CARRYING OUT THE INVENTION

Figure 6:
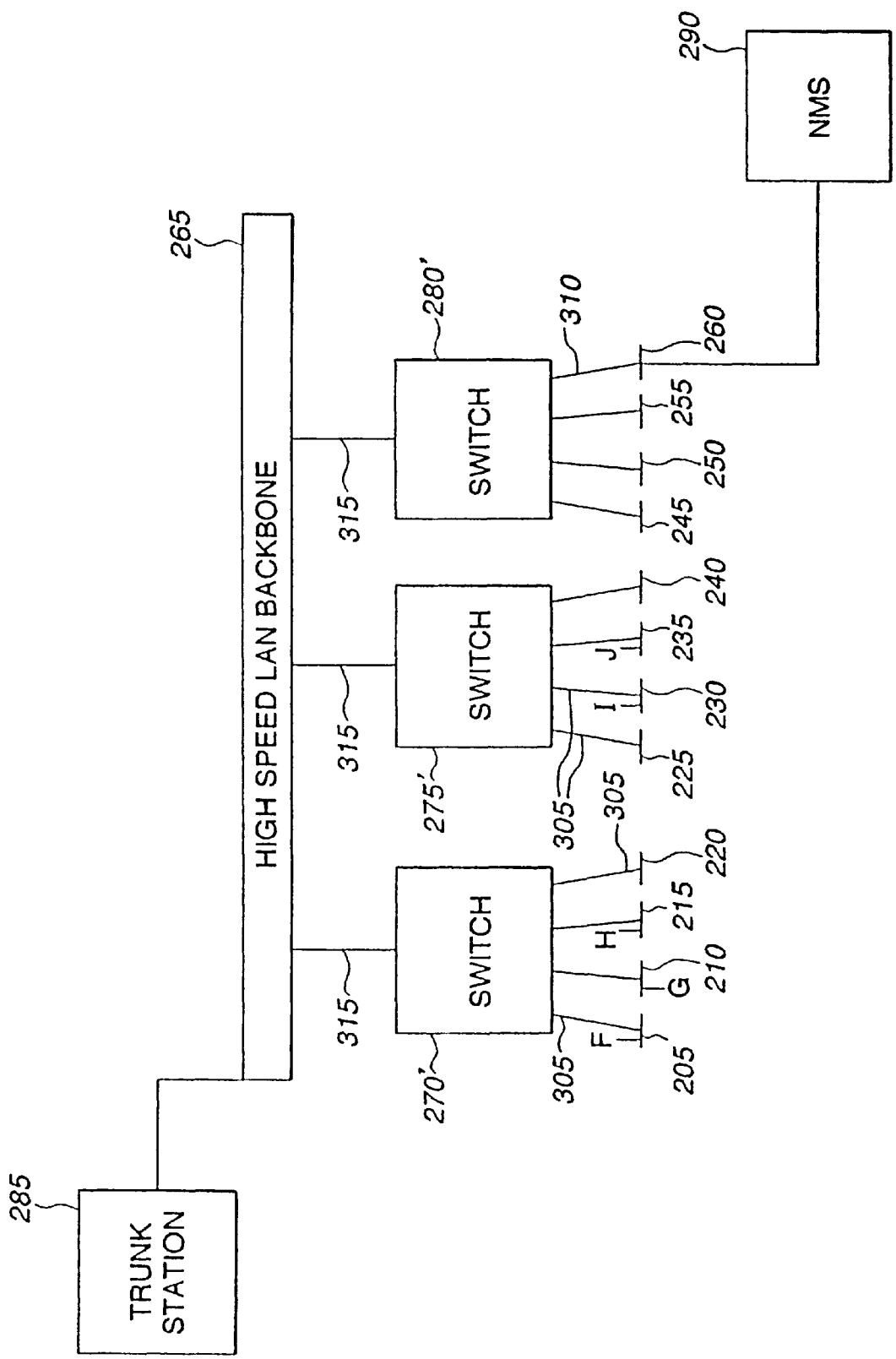
FIG. 6 depicts a schematic diagram of a VLAN system in accordance with the present invention.

FIG. 6 depicts a virtual communications network or system in accordance with the present invention. The network includes multiple local area networks (LAN's) 205–260 interconnected by multiple multiported reconfigurable switches 270', 275' and 280' all connected by a high speed backbone LAN 265. Each LAN, other than the backbone LAN 265, is connected to one of the switches 270', 275' or 280' by a communications or access port 305 or 310, while the backbone LAN 265 is connected to each switch by a communications or trunk port 315. A network management system (NMS) 290, which may be a workstation having the network management software loaded thereon, manages the network by configuring the network via the switches 270', 275' and 280' to form multiple virtual local area networks (VLAN's) . A trunk station 285, for example a network server, is connected directly to the backbone LAN 265 via a trunk port.

Figure 8:
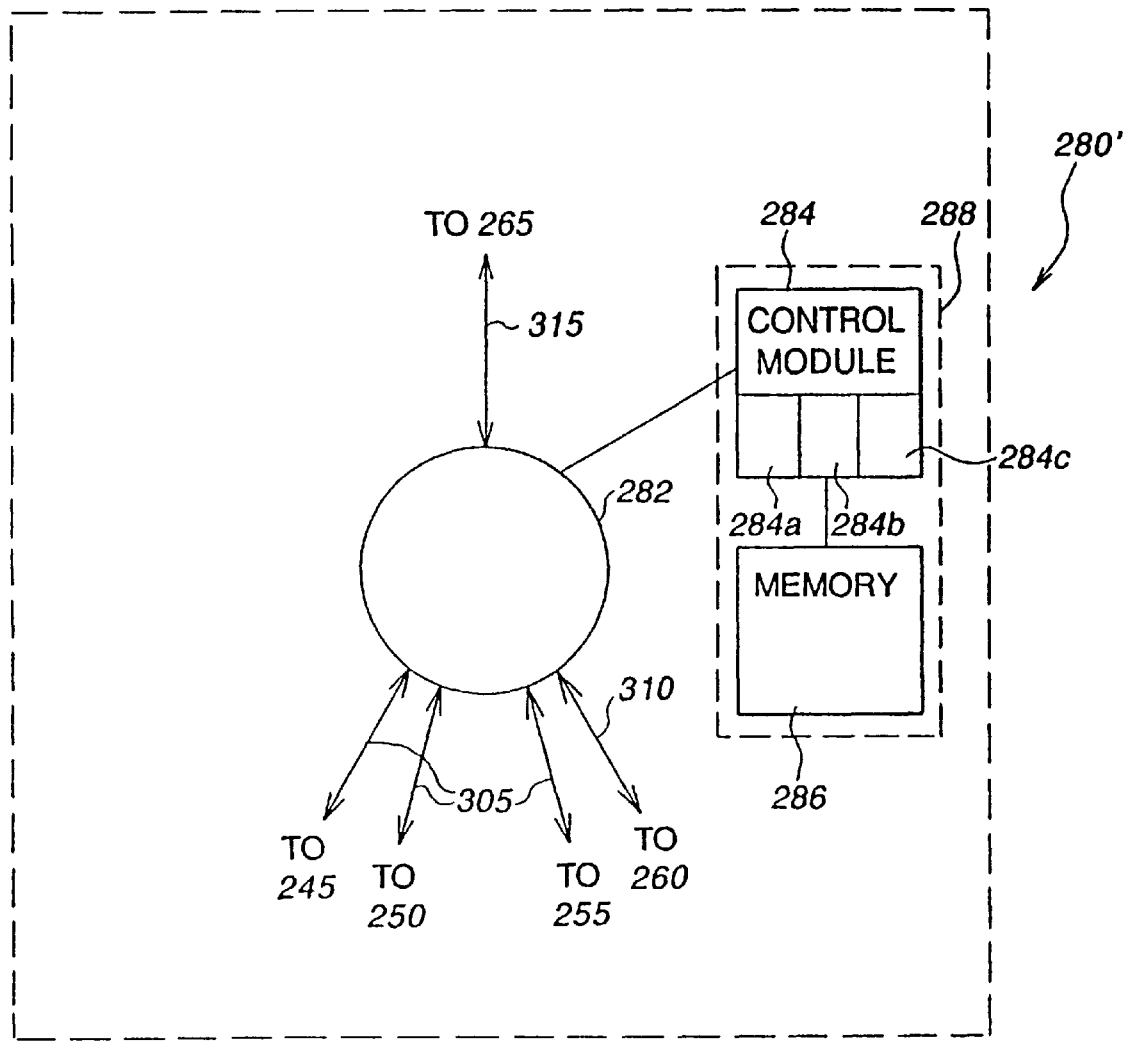
FIG. 8 depicts a switch in accordance with the present invention for use in the FIG. 6 system.

Referring to FIGS. 6 and 8, the switch 280' is capable of linking the NMS 290, which is a member of LAN 260 and serves as a network resource, to other local area networks 205–255, each of which may be within one or more VLAN's confirmed by the NMS 290. For purposes of this description, the LAN 260, which is connected to the switch 280' by access port 310, is not included in any of these virtual networks and therefore the NMS is not a member of any VLAN which includes LAN's 205–255. It will, however, be recognized by those skilled in the art, that this will not necessarily be the case in practical VLAN implementations.

As shown in FIG. 8, the switch 280' includes a control console 288 having a control module 284 and a memory 286 for storing and processing control instructions and VLAN configuration and privilege data, which may be initially programmed into the switch or transmitted to the switch by the NMS 290. The control module 284 includes a controller 284a for controlling the switching device 282. A detector 284b is provided for detecting a communication, which will typical include some type of message for a network user, received via trunk port 315 from the backbone 290 or via access ports 305 or 310 from the LAN's 245–260.

It should be noted that communications received from LAN 260 are transmitted to switch 280' via port 310. In accordance with the invention the detector 284b preferably treats all communications to a network addressee received via the port 310 as a privileged communication. Accordingly, all messages to a network addressee from the NMS 290 are identified as a privileged communication. The control module 284 also includes a tagger 284c for tagging or encapsulating such communications by appending a privileged header thereto.

Figure 1:
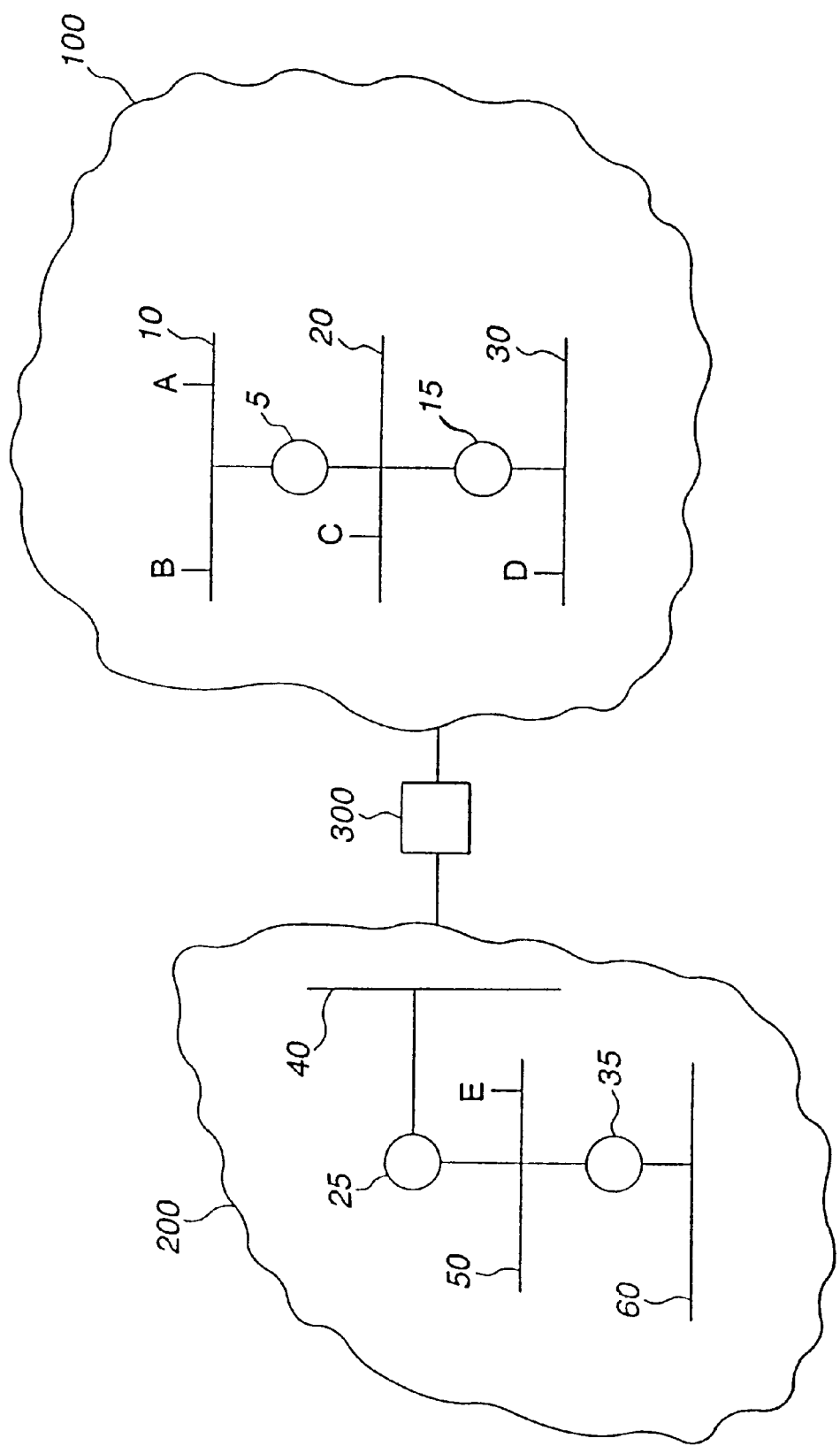
FIG. 1 depicts a prior art LAN configuration.
Figure 2:
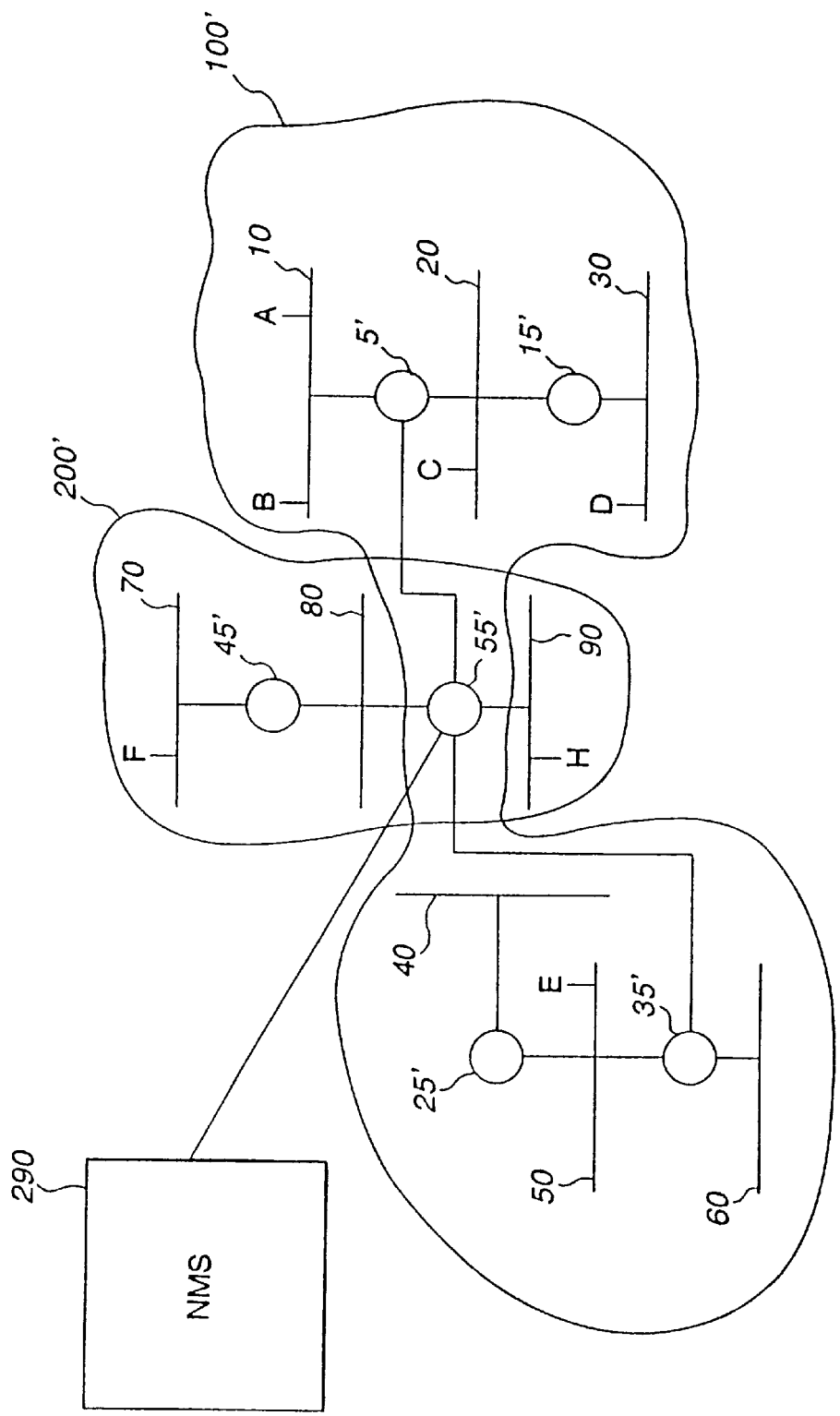
FIG. 2 depicts a prior art VLAN configuration.
Figure 3:
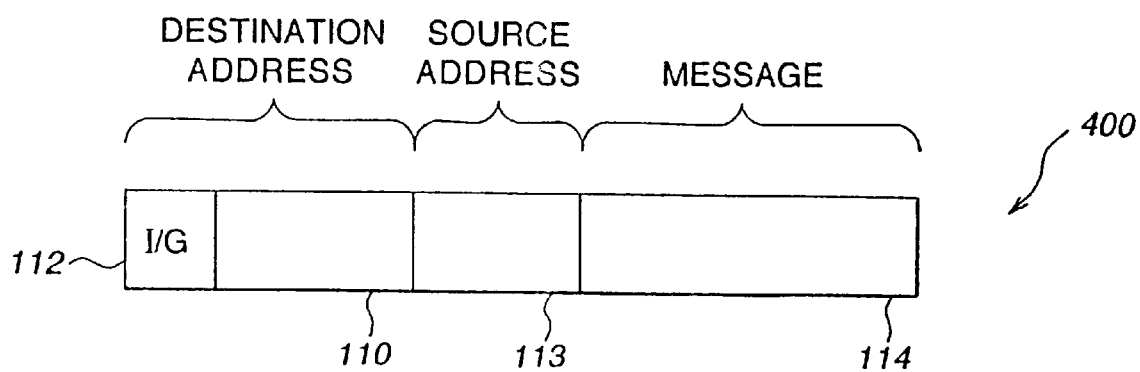
FIG. 3 depicts a conventional LAN message packet.
Figure 4:
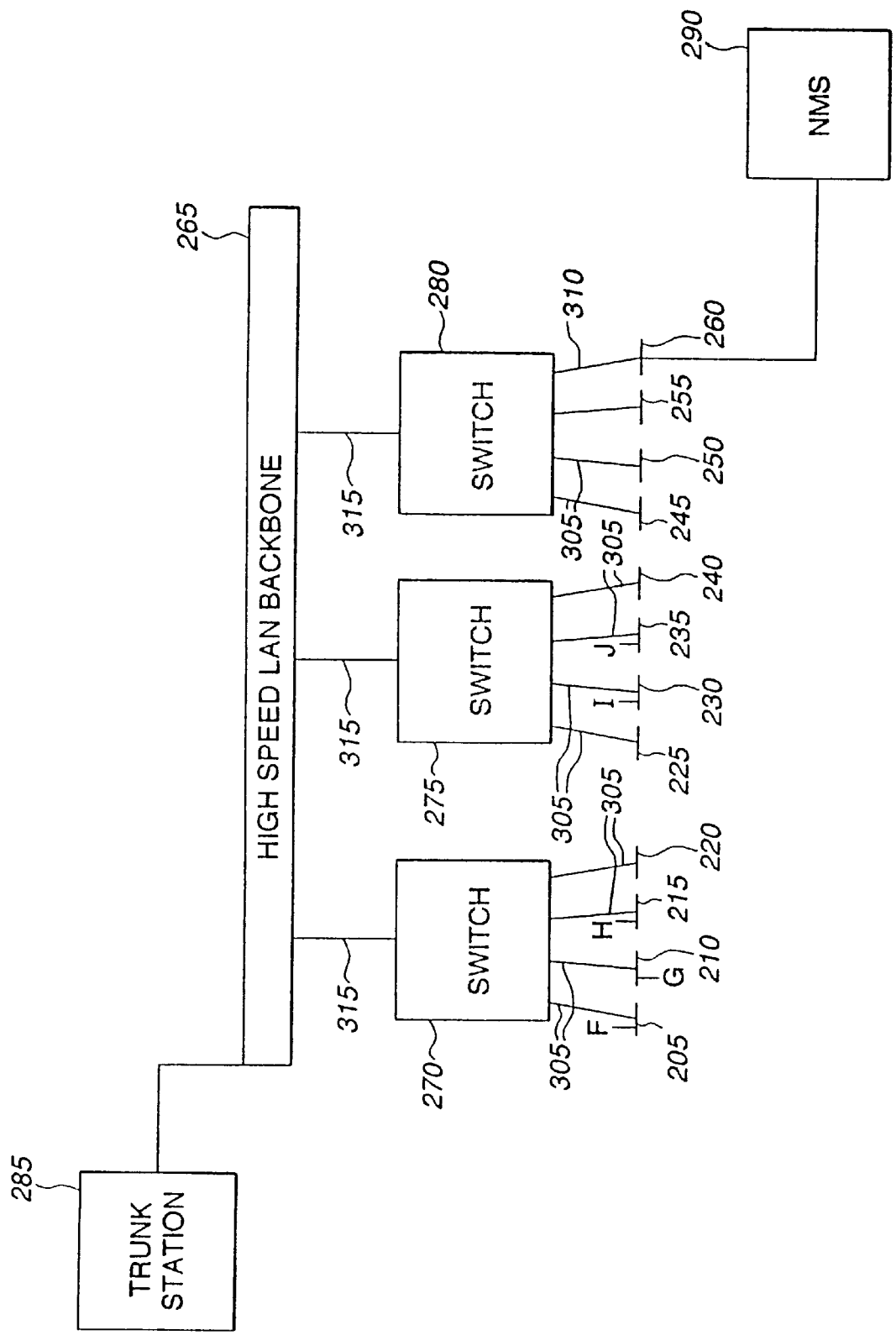
FIG. 4 depicts a schematic diagram of a conventional VLAN system.
Figure 5:
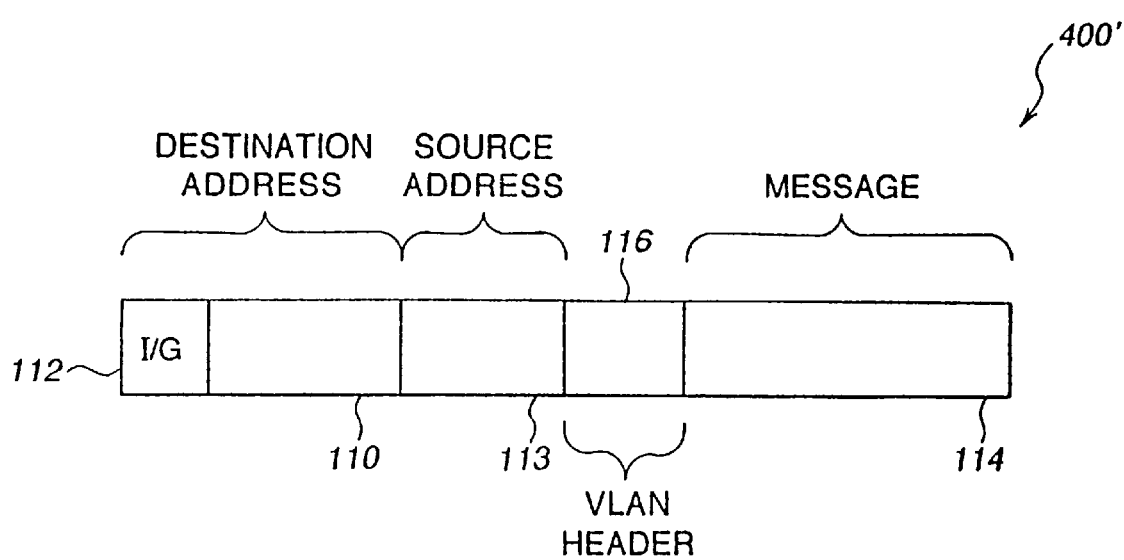
FIG. 5 depicts a conventional VLAN message packet.
Figure 7:
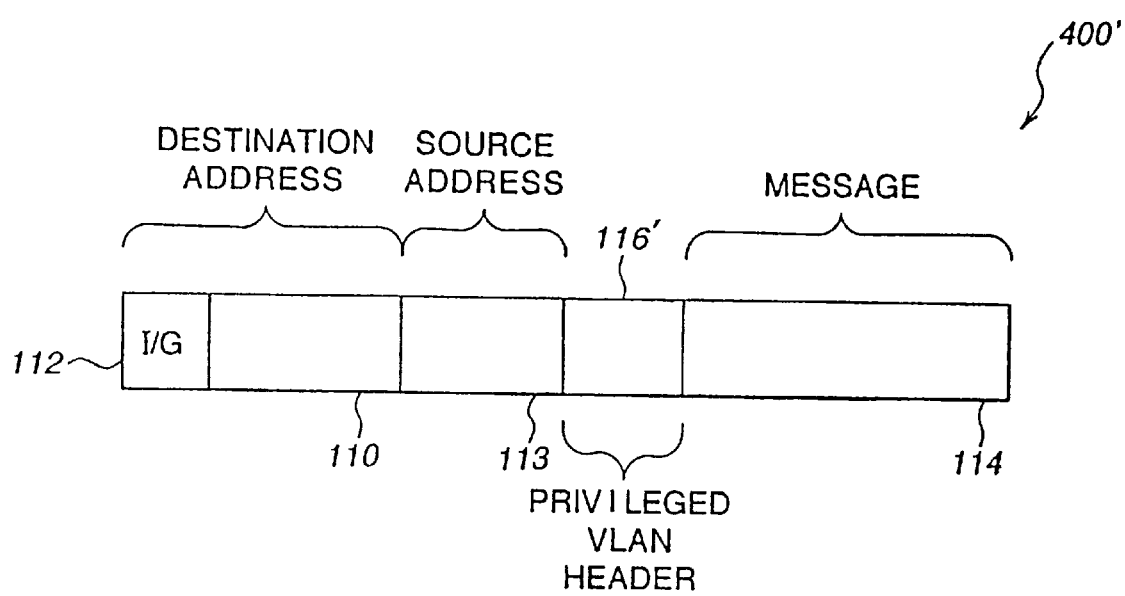
FIG. 7 depicts a message packet in accordance with the present invention.

FIG. 7 depicts a communications packet which, except as will be described below, is similar to the communications packet described above with reference to FIG. 5 above. Like segments of the packets of FIGS. 5 and 7 are referenced with like numerals. The difference between the packets of FIGS. 5 and 7 resides in differences in the respective the VLAN headers. More particularly, the packet 400" of FIG. 7 includes a privileged VLAN header 116' in lieu of the conventional VLAN header 116 of packet 400'. The privileged VLAN header 116' is a special header which, as described above is appended to each communication received by switch 280' via access port 310. All communications received via port 310 are appended with the privileged VLAN header 116' whether or not the LAN 260 is configured within one or more VLAN's. Further, as will be described in detail below, the privileged VLAN header 116' is known to all other switches 270'–280' and beneficially stored in memory on each network switches. The privileged VLAN header 116' can, as will be understood by those skilled in the art, be easily arranged within any standard VLAN packet header protocol.

Figure 9:
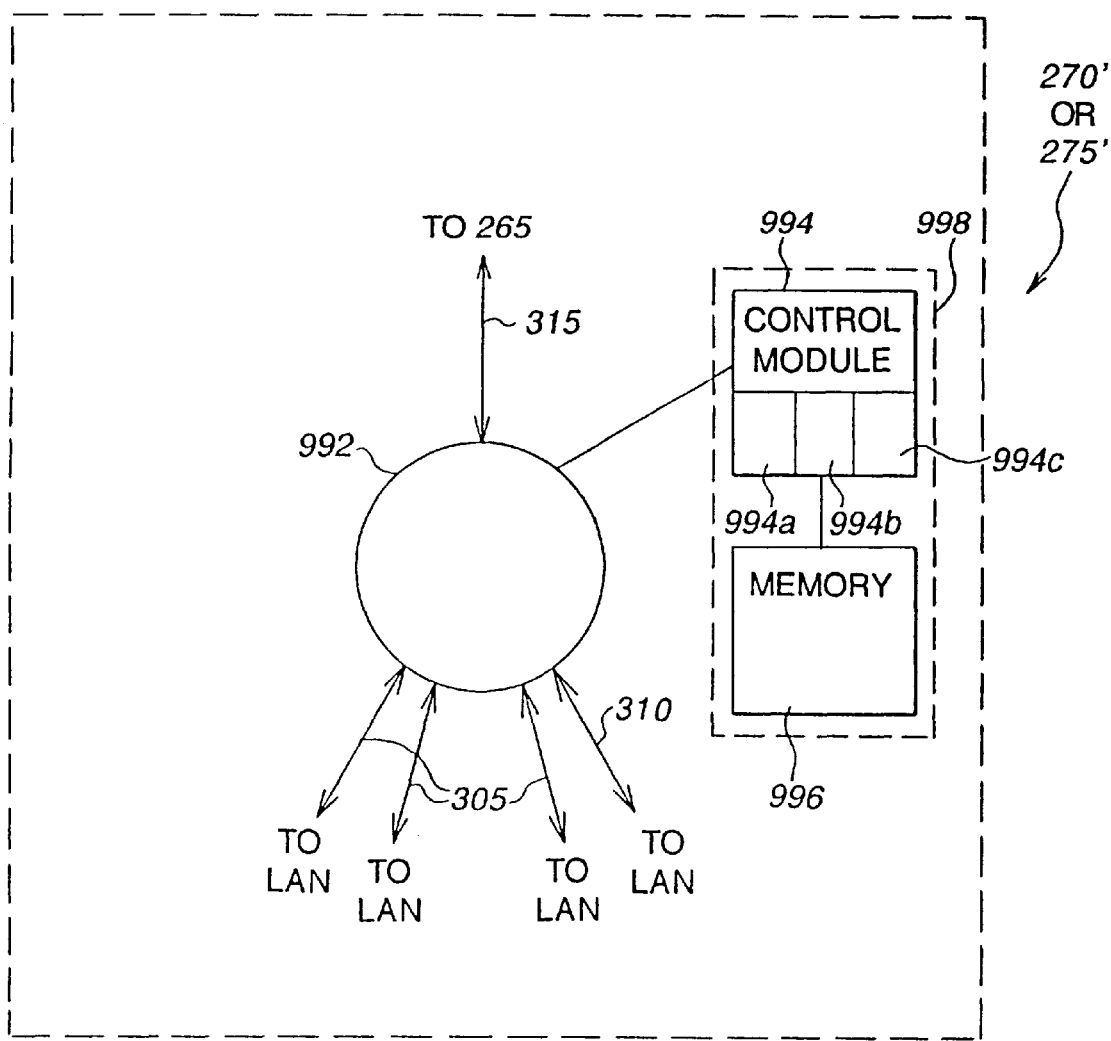
FIG. 9 depicts another switch in accordance with the present invention for use in the FIG. 6 system.

Turning now to FIG. 9, as shown the switches 270' and 275' each include a control console 998 having a control module 994 and a memory 996 for storing and processing control instructions and VLAN configuration and privilege data, which may be initially programmed into the switch or transmitted to the switch by the NMS 290. The control module 994 includes a controller 994a for controlling the switching device 992. A detector 994b detects a communication received via a trunk port 315 from the backbone 265 or via an access port 305 from the LAN's 205–220 or 225–240, as applicable.

The detector 994b detects all communications over the backbone LAN 265 which have a privileged header appended thereto, e.g., all communications from the NMS 290 which have been tagged and transmitted by switch 280'. If, in the case of switch 270', the detected privileged communication is addressed to a network addressee on any of the LAN's 205–220 or, in the case of switch 275', the detected privileged communication is addressed to a network addressee on any of the LAN's 225–240, the controller 994a of the applicable switch 270' or 275' controls the switching device 992 to transmit the message from the input trunk port 315 to the applicable output access port 305. Accordingly, all messages from the NMS 290 are identified as a privileged communication and forwarded to the appropriate LAN of which the addressee is a member. The control module 994 also includes a tagger 994c for discarding the tag by removing the privileged header from the communication, prior to the message being transmitted to the output access port 305. That is, the tagger 994c removes the privileged header from such communications prior to the controller 994a controlling the switching device 992 to transmit the message from the input trunk port 315 to the output access port 305.

Turning again to FIG. 8, if the detected communication received via access port 310 is addressed to a network addressee on any of the LAN's 245–255, the controller 284a of the switch 280' controls the switching device 282 to transmit the message from the input port 310 to the applicable output port 305. Even in the case where the addressee is a member of a LAN connected directly to the same switch as the NMS 290, i.e. one of LAN's 245–255, it may, in certain implementations be beneficial for the tagger 284c to append the header to the privileged communication, e.g., when the privileged communications will typically be addressed to numerous addressees on various LAN's, and for the detector 284b to detect all communications after tagging by tagger 284c to determine if the privileged communication from the NMS is addressed to a member of any of LAN's 245–255. In such an implementation, the tagger 284c discards the privileged tag by removing the appended header from the communication, prior to the message being transmitted to the output access port 305 of switch 280'. More particularly, the tagger 284c removes the privileged header from such communication prior to the controller 284a controlling the switching device 282 to transmit the message from the input access port 310 to the output access port 305.

Accordingly, all messages from the NMS 290 are identified as a privileged communication and forwarded to the appropriate addressee LAN whether the addressee is member of a LAN connected directly to switch 280' or another switch, i.e. whether or not the addressee is a member of a LAN which is connected to an access port 305 of the same or a different switch than that to which the NMS 290 is connected by access port 310. Further, the addressee receives messages from the NMS 290 whether or not the NMS and addressee are members of LAN's configured within the same VLAN. Hence, even if the LAN 260 were to be inadvertently configured into a VLAN by the NMS 290 which excluded all other network LAN's, e.g. LAN's 205–255, communications from the NMS 290 to any user on LAN's 205–255 would be transmitted by the applicable switch 270'–280' to the appropriate addressee LAN, and accordingly be delivered to the desired network user.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. VLAN management, those skilled in the art will recognize that its usefulness is not limited thereto and that the present invention can be beneficially utilized in any number of environments and implementations, e.g. to ensure access to a network server by all users at all times notwithstanding the configuration of the network VLAN's. Accordingly, the claims set forth below should be construed in view of the full breadth and spirit of the invention as disclosed herein.

I claim:

1. A switch for use in a virtual communications system having multiple local area networks interconnected by multiple switches, comprising:

a first communications port configured to connect to a network resource;

a second communications port configured to connect to other switches in the virtual communications system; and a control console configured to detect a communication from the network resource to an addressee and to append a privileged header to the communication, the addressee being a member of a local area network within one or more virtual area networks which exclude the network resource and the local area network being interconnectable to the second communications port by another switch;

wherein the privileged header is detectable by the another switch, responsive to which the another network switch directs the communication to the local area network.

2. A switch according to claim 1, wherein the network resource is a network manager.

3. A switch according to claim 1, wherein the local area network is a first local area network, the network resource is a member of a second local area network within a virtual network which is different than the one or more virtual area networks.

4. A switch according to claim 1, wherein the privileged header is removed from the communication by the another network switch prior to directing the communication to the local area network.

5. A switch according to claim 1, wherein the switch is a multiported reconfigurable switch.

6. A method for communicating messages in a virtual communications system having multiple local area networks interconnected by multiple switches, comprising the steps of:

identifying a communication from a network resource to an addressee, the addressee being a member of a local area network; and appending a privileged header to the communication;

directing the communication to the local area network responsive to detecting the privileged header.

7. A method for communicating messages in a virtual communications system according to claim 6, wherein the network resource is a network manager.

8. A method for communicating messages in a virtual communications system according to claim 6, wherein the local area network is a first local area network, the network resource is a member of a second local area network within a virtual network which is different than virtual area networks configured to include the first local area network.

9. A method for communicating messages in a virtual communications system according to claim 6, wherein the privileged header is removed from the communication prior to the communication being directed to the local area network.

10. A switch for use in a virtual communications system having multiple local area networks interconnected by multiple switches, comprising:

a first communications port configured to connect to a local area network within one or more virtual area networks;

a second communications port configured to interconnect to other switches in the virtual communications system; and a control console configured to allow a message addressed to a member of the local area network to be transmitted from the second communications port to the first communications port if the message is from one of (i) another local area network within the one or more virtual area networks and (ii) a sender excluded from the one or more virtual area networks if the message is included in a communication designated as privileged.

11. A switch according to claim 10, wherein the sender of the privileged communication is a network manager.

12. A switch according to claim 10, wherein the switch is a multiported reconfigurable switch.

13. A switch according to claim 10, wherein:

the privileged communication includes a privileged header; and the control console removes the privileged header from the privileged communication prior to allowing the message to be transmitted from the second communications port to the first communications port.

14. A method for communicating messages in a virtual communications system having multiple local area networks interconnected by multiple switches, comprising the steps of:

identifying a communication including a message which is addressed to a member of a local area network within one or more virtual networks; and forwarding the message to the member of the local area network if the message is one of (i) a message from a sender within the one or more virtual area networks and (ii) a message included in a communication designated as privileged from a sender excluded from the one or more virtual area networks.

15. A method according to claim 14, wherein the sender of the privileged communication is a network manager.

16. A method according to claim 14, wherein the forwarding of the message includes controlling a switching device to transmit the message from an input port to and output port.

17. A method according to claim 16, wherein the switching device is connected by the output port to the local area network without further switching.

18. A method according to claim 14, wherein the privileged communication includes a privileged header and further comprising the step of:

removing the privileged header from the privileged communication prior to forwarding the message to the member of the local area network.

19. A virtual communications system having multiple local area networks interconnected by multiple switching devices, comprising:

a network resource;

a switching device configured to link the network resource to a local area network, the local area network being within one or more virtual area networks, all of which exclude the network resource; and a tagger configured to append a privileged header to a communication from the network resource to an addressee, the addressee being a member of the local area network;

a switch controller configured to detect the privileged header and to control the switching device so as to direct the communication to the local area network responsive to detection of the privileged headed.

20. A virtual communications system according to claim 19, wherein the network resource is a network manager.

21. A virtual communications system according to claim 19, wherein the network resource is a member of another local area network within another virtual network which is different than the one or more virtual area networks.

22. A virtual communications system according to claim 19, wherein the controller removes the privileged header from the communication prior to the switching device directing the communication to the local area network.

23. A virtual communications system according to claim 19, further comprising:

another switching device connected to the network resource by a port;

wherein the tagger appends the privileged header to the communication responsive to the communication being received at the port.

* * * * *